United States Patent [19]

Robinson

[11] 3,820,312
[45] June 28, 1974

[54] GRASS CATCHER
[75] Inventor: Donald E. Robinson, Marysville, Ohio
[73] Assignee: The O.M. Scott & Sons Company, Marysville, Ohio
[22] Filed: Nov. 24, 1969
[21] Appl. No.: 879,181

[52] U.S. Cl. ............................................. 56/202
[51] Int. Cl. ......................................... A01d 35/22
[58] Field of Search .................... 56/194, 198–200, 56/202–206

[56] References Cited
UNITED STATES PATENTS
| | | | |
|---|---|---|---|
| 955,566 | 4/1910 | Wetteroth | 56/199 |
| 991,773 | 5/1911 | Eberle | 56/199 |
| 995,231 | 6/1911 | Eberle | 56/199 |
| 996,108 | 6/1911 | Meyer | 56/199 |
| 1,917,782 | 7/1933 | Vachon | 56/202 |
| 2,579,103 | 12/1951 | Whittaker | 56/200 |
| 3,084,363 | 4/1963 | Vetne | 56/200 X |

*Primary Examiner*—Louis G. Mancene
*Assistant Examiner*—J. A. Oliff
*Attorney, Agent, or Firm*—Strauch, Nolan, Neale, Nies & Kurz

[57] ABSTRACT

A catcher for grass discharged from a reel mower. It has a flat bottom and a bent wire frame secured under the bottom with front hooks for coupling to the mower and portions rotatably mounting rollers adjacent the rear edge. It has no support devices within the space defined by side and rear walls. The side and rear walls of the catcher are made from a light weight, flexible, woven material with attached top edge and front edge braces formed from separate U-shaped wire rods articulated to collapse when not in use. A specially shaped rear wire rod bail pivotally mounted adjacent the bottom rear edge of the catcher provides a quick release wall support and latch, cooperating with the top edge wire rod which is enclosed within the top edge binding on the rear wall.

17 Claims, 8 Drawing Figures

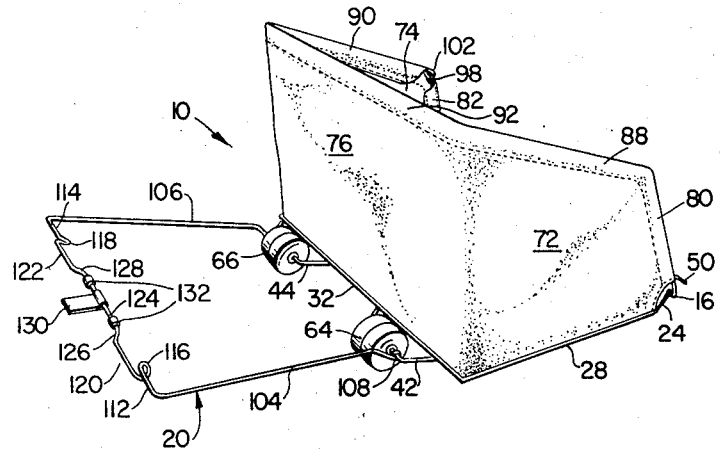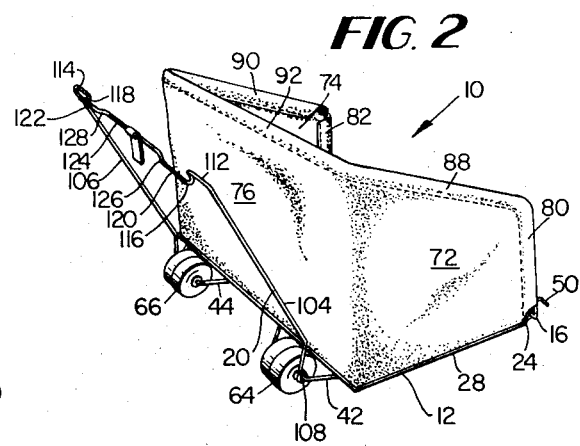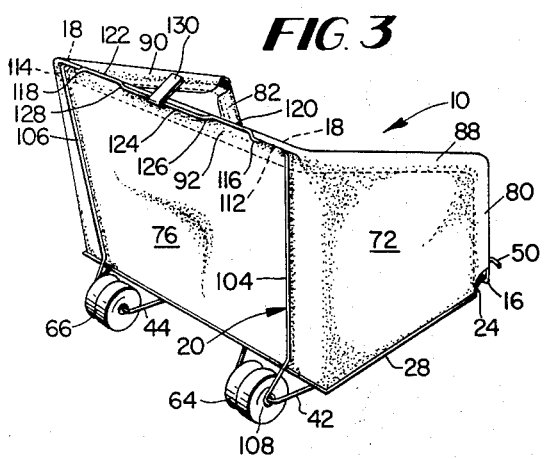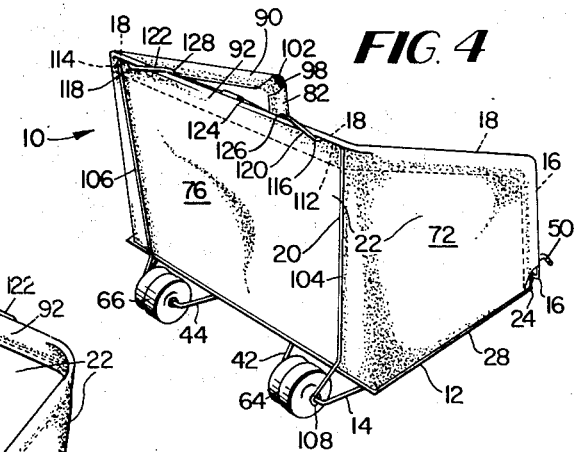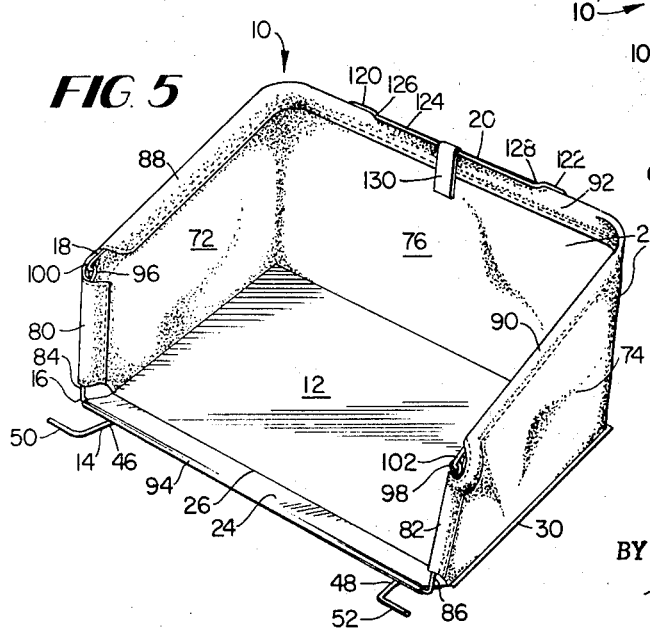

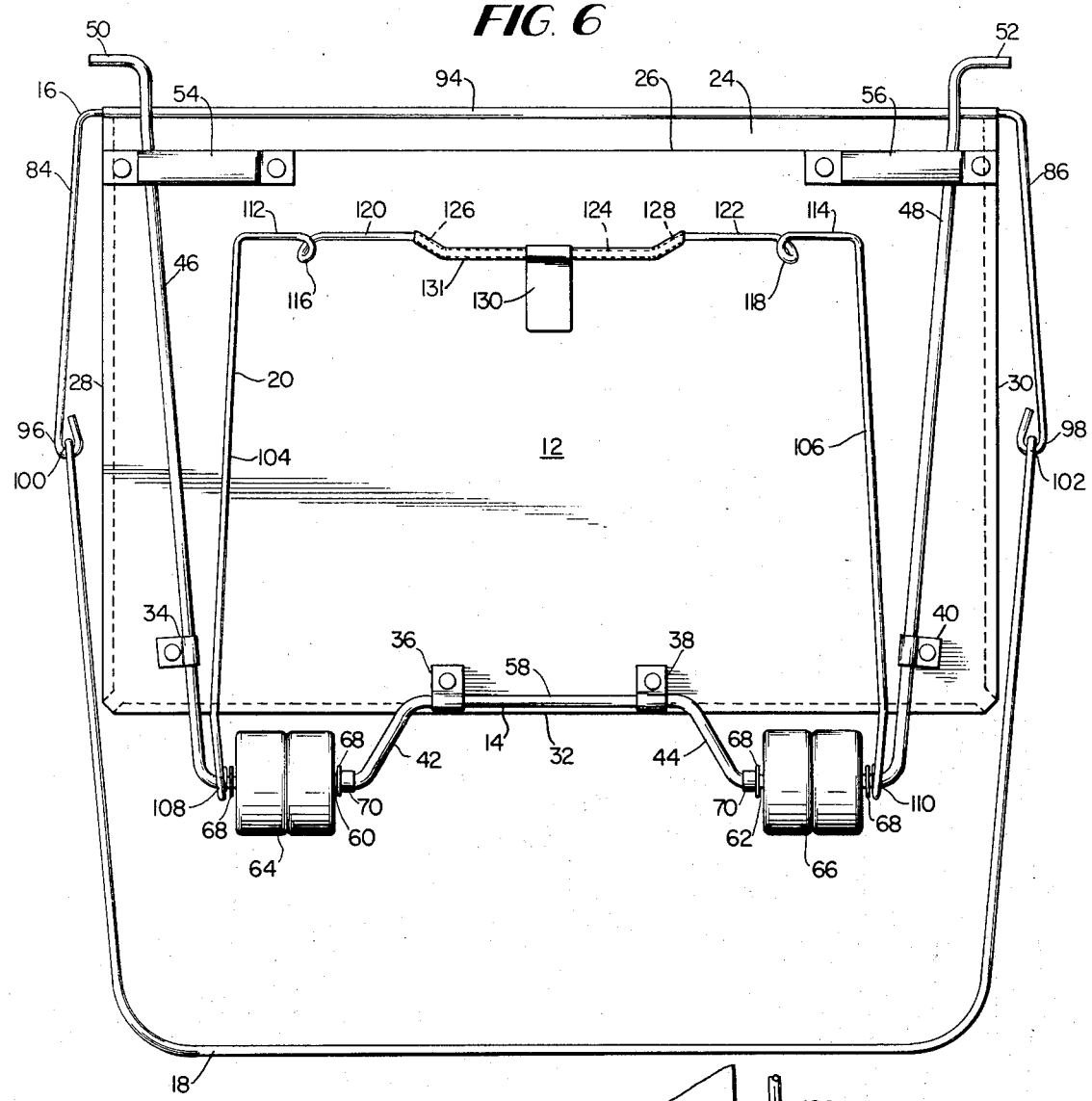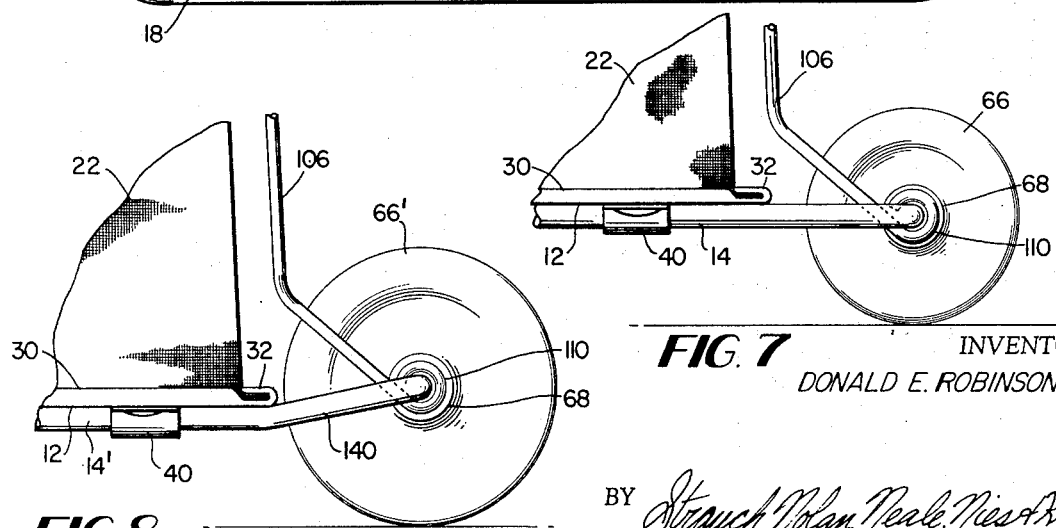

GRASS CATCHER

BACKGROUND OF THE INVENTION

In the field of turf care, mowers are primary implements and related to mowers is the problem of collecting the clippings created by the mowers. In connection with the two popular type mowers, rotary and reel, in recent years collection of clippings from the rotary mower has received the lion's share of attention insofar as advancement and improvements are concerned. Grass catchers for reel mowers have remained essentially unchanged in principle of operation, design and limitations.

As used with reel mowers the catcher normally consists of a box-like configuration positioned in front of or behind the cutting reel to receive the discharge pattern of clippings through an opening of the box-like structure. Several methods by which the catcher is carried or conveyed with the mower have been developed. One major approach consists of using one or more hooks or bearing points on the mower chassis to support the front of trailing catchers, supplemented by a suspension device coupled to the mower handle. In this approach the catcher with clipping load is totally supported by the mower and whether or not the catcher floor surface is level is dependent upon handle angle which in turn varies with operator height and/or mowing habits. A later approach in catcher design incorporates a modified catcher to mower coupling in which suspension from the handle is eliminated and instead the trailing end of the catcher is provided with wheels or skids, usually located under the catcher floor, to ride on the turf. Such previously known structure, by removing a portion of weight from the mower, does allow freedom of handle position without affecting the desirable levelness of catcher.

Reel mower catchers normally have the container walls made of materials intended to provide a durable container with minimum weight. Other than the floor structure, they generally utilize a fabric material supported on a heavy wire frame. In some case the wire frame is designed to fold compactly for shipping and storage. A major disadvantage of many previously known folding designs is that they result in an insecure frame structure which may inadvertently unfold during use. Previously known rigid, self-supporting sidewalls suffer the disadvantage of higher cost and greater weight. Other problems existing in previously known reel mower catchers are that quick and easy dumping is not possible where internal supporting framework constitutes barriers preventing free removal of material out of the catcher and can also prevent clear easy flow of clippings into the catcher. In designs which use suspension of the catcher from the mower handle, a premature loss of clippings can result when the handle is elevated. In prior art devices, wheels or skids disposed under the catcher floor cause a high degree of friction with resultant high drag in lush, heavy turf, and also small wheels or skids can dig or snag in depressions, edges of sidewalk and the like.

SUMMARY OF THE INVENTION

Accordingly, a primary object of this invention resides in the provision of a novel folding grass catcher for use with a reel type mower that will minimize or eliminate the aforedescribed problems.

A further object resides in the provision of a novel reel mower grass catcher in which all internal open framework and/or other obstructions within the clipping container which can disrupt flow of clippings either into or out of the catcher are eliminated, yet the catcher frame is rigidly secured in use and easily and readily foldable when desired.

A still further object resides in the provision of novel grass catcher structure in which the elevation of the rear of the floor is reduced to a minimum to increase effective capacity and better restrain clippings against loss. Coupled with this object is the provision of novel structure which enables an increase in trailing wheel diameter to minimize propelling effort and allow easier rolling effort over irregularities in or around area of use.

Still another object resides in providing a novel folding wire frame which cradles the upper edge of the rear wall and also provides a positive latch system preventing the catcher walls from folding while subjected to the vibration and strain of use, at the same time requiring no tools, loose parts, or time consuming effort to either set it up for use or fold it for storage.

Further novel features and other objects of this invention will become apparent from the following detailed description, discussion and the appended claims taken in conjunction with the accompanying drawings.

BRIEF DESCRIPTION OF DRAWINGS

A preferred structural embodiment of this invention is disclosed in the accompanying drawings, in which:

FIGS. 1-4 are perspective views looking at the rear quarter of a grass catcher made in accord with the present invention, illustrating the progressive steps in deploying the container into its latched assembled form for attachment to the rear of a reel type lawn mower;

FIG. 5 is a front perspective view looking down at the grass catcher shown in FIG. 4;

FIG. 6 is an enlarged bottom view of the catcher in folded condition with the side material deleted to better illustrate the wire frame details;

FIG. 7 is an enlarged side elevational detail of the wheel support structure; and FIG. 8 is a view similar to FIG. 7 illustrating how, by a simple modification, the wheel support structure can be changed so larger diameter wheels with axes raised above the level of the container bottom can be used.

GENERAL DESCRIPTION

The unfolded and latched grass catcher 10, as illustrated in FIGS. 4 and 5, has a sheet metal floor 12 to which are secured: a bent wire base frame and wheel support 14, also incorporating hooks to attach the catcher to a lawn mower (not shown); a two piece collapsible wire frame 16 and 18; a bent wire wall latching and support member 20; and the flexible side and rear unit 22.

With reference to FIG. 6, the bottom of the catcher which is called the floor 12 is made from a substantially rectangular piece of sheet metal with a short front lip portion 24 upturned at an inclination of approximately 60 degrees along a straight bend line 26. Both of the side edges 28 and 30 and the rear edge 32 of the floor together with the adjacent lower edges of the flexible material of the side walls are double folded up and over against the upper floor surface and pressed tight to provide an interlocked joinder seam between the floor and the side and rear walls. An end view of the folded interlocked rear edge 32 can be seen in FIG. 7. The floor 12 can be made from a tough substantially rigid plastic sheet if desired in which case a bonding agent can be used with or without a folded interlocked edge seam to join the walls to the floor.

A bent wire rod 14 is secured under the floor 12 by clips 34, 36, 38 and 40 riveted to the floor. Rod 14 is bent to form a distorted W of which the lower bight shaped legs 42 and 44 project beyond the rear edge 32 of the floor and the outer legs 46 and 48 extend forward and adjacent the front edge, are inclined upward, projecting about 1½ inches beyond the front lip 24 of the floor. The terminal ends of both legs are bent laterally outward to provide short hooks or lugs 50 and 52. At a location under the floor and adjacent the front edge bend line 26, the two wire legs 46 and 48 are retained against the bottom surface of the floor by elongate brackets 54 and 56 riveted to the floor. The elongate brackets permit several inches of lateral inward deflection of the two wire legs, which are sprung so they are self-biased outwardly thus providing the well-known wire spring lateral lug structure for coupling a grass catcher to available bracket structure at the rear of a reel mower. Such structural cooperation, being an old expedient, is not herein disclosed, however it is common to provide holes or slots in the mower side frames or roller end brackets to receive the bent lug ends of the two spring wire lugs 50 and 52.

The middle portion 58 of the bottom frame bent rod 14 is disposed laterally along the bottom of floor 12 adjacent the rear edge 32 and is held in position by the aforedescribed clamps 36 and 38. The two bights 42 and 44 are complementary and have rear laterally disposed sections 60 and 62 which serve as wheel or roller axles, and in the described example rotatably carry dual wheels 64 and 66. Spacing devices such as washers 68 and sleeves 70 keep the wheels centered and away from the bends of the rod to permit freedom for rotation.

Returning now to FIGS. 1-5, the flexible material wal unit 22 is illustrated with side walls formed as trapezoids 72 and 74 with their small ends forward and a rectangular shaped back wall 76. Wall unit 22 preferably made from a wear resistant flexible material, e.g., a woven fabric with a porous weave made from plastic threads or some other thread, material which can be weatherproofed. The front edges of side walls 72 and 74 are hemmed at 80 and 82 to receive the two short legs 84 and 86 of the U-shaped front frame rod 16 and the upper edges of 88, 90 and 92 of both sides walls 72 and 74 and rear wall 76 are formed as a continuous U-shaped hem into which is inserted the large U-shaped top frame rod 18.

The front frame rod 16 has its mid portion pivotally secured within a downward rolled front edge 94 of the floor 12, permitting the two legs 84 and 86 of front frame 16 to be pivoted forward from a rear folded position to the upright location shown in FIGS. 1-5, its forward limit position determined by the side wall front edge hems 82 and their lower edges clamped in the edges of the floor.

Eyes 96 and 98 formed at the ends of the two front frame legs 84 and 86 are pivotally interlinked with eyes 100 and 102 formed at the ends of the legs of the top frame 18. The foregoing assembly of front frame 14, top frame 16 and wall unit 22 permits the frame and wall material to be swung to the rear in a flat disposition along and to the rear of the floor when the rear support 20 is not latched to the top frame 18 as will be described. FIG. 6 illustrates the folded disposition of the front and top frames 16 and 18 as well as the folded rear support 20 swung completely under and up against the floor 12.

FIGS. 2 and 6 clearly illustrate the special shape of the rear support and latch member 20. Basically, it is a wire rod having a lateral mid-section whose length is about the width of the rear wall 76 with two spaced apart rigid legs 104 and 106 and the ends of which have eyes 108 and 110 encircling the respective axles 60 and 62 adjacent the wheels. Alternatively, the legs of the rear support could be pivotally secured at the rear edge of the floor. The length of the rear support legs 104 and 106 is greater than the height of the rear wall 76 and adjacent the upper end of each leg are respective short lateral portions 112 and 114 which can be termed end cradles of the lateral mid-sections which are denoted by downward and outward curved bends 116 and 118 in the nature of a partial coil forming two cradle hooks each of which join with a short straight section 120 and 122 at substantially the same level as short end portions 112 and 114. The remaining midportion 124, considering the support as upright, is offset slightly forward and lower than portions 120 and 122 by bends 126 and 128, and a sheet metal manipulating tab 130 is slidably rotatably secured around the mid-portion 124. The distance of offset, both forward and lower is approximately the diameter of the top frame rod 18. In lieu of or in addition to the manipulating tab 130, a plastic sleeve 131, as shown in FIG. 6, or one long or several short, small diameter rollers 132, as shown in FIG. 1 can be placed on the rear support mid portion 124 as an aid in keeping the manipulative latching force to a minimum by reducing the frictional engagement as the mid-portion 124 is slipped into clamping position over the upper edge of the rear wall.

In the aforedescribed embodiment, wheels 64 and 66 can be made from plastic or as conventional rubber tired steel wheels with sleeve hubs. It is to be understood that each of the trailing wheels could be a single wheel or a plurality of more than one. More or less than the disclosed dual wheels can be accommodated merely by revising the bends in the rod 14 which serve as the axle portions 60 and 62.

Because the wheel axes are disposed behind the catcher floor 12 rather than under the floor, the height of the floor above the turf can be kept at a desired low level while using wheels of a diameter permitting easy rolling along the turf. Still larger diameter wheels 66' (FIG. 8) can be used without raising the height of the catcher floor by making a slight modification, an upwardly bent inclination in the axle portion 140 of the wire rod 14' as shown in FIG. 8.

Each of the bent wire rods 14 and 14' has a multiple function, serving as a floor reinforcement structure, wheel axles and as the spring latched coupling between catcher and mower.

ASSEMBLY OF CATCHER

The grass catcher 10 folds into a substantially flat assembly for storage and shipping as can be visualized from FIG. 6 and can be rapidly and easily unfolded and secured in its assembled form for use.

To unfold the catcher 10 into its use position, the top frame 18 is grasped and raised as shown in FIG. 1. That movement will unfold the side and rear walls, 72, 74 and 76 which limit the unfolded positions of the top frame rod 18 as well as the forward position of the front frame rod 16. The rear support bail 20 is then swivelled down, backwards and up against the rear wall 76 (FIGS. 1–3). The straight middle portion of the top frame 18, that portion enclosed within the hem 92 along the top edge of the rear wall 76, by pulling upward on the enclosed rod and hem 92, will resiliently stretch the rear wall 76 so the enclosed rod can be slipped over the two hook shaped cradle portions 116 and 118 at the top corners of the rear support. At this stage, the outboard upper corners of the rear support 20 cradle the fabric enclosed top frame 18 at spaced apart locations, an arrangement shown in FIG. 3.

Now by lifting up on the mid portion 124 of the rear support, which can be accomplished by rotating the tab 130 up and over the hem in the manner of a lever or by grasping the mid portion 124 itself, the central offset area 124 can be flexed and slipped forward over the hem enclosed rod at the top edge of the rear wall, this latter disposition being illustrated in FIG. 4. This disposition causes the mid portion 124 to overly and clamp the top rod down within the rear support and cradles 116 and 118.

The inherent spring bias of the wire rod which constitutes the rear support 20 makes it self-locking relative to the top frame 18 enclosed in the hem 92, yet at the same time by reversing the aforedescribed procedure the rear support 20 can be easily unlatched (or clamped) and swivelled back and down under the floor, permitting the grass catcher wall to be collapsed into its flat disposition for storage.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A grass catcher comprising: an enclosure made from flexible material having a continuous wall along two sides and the rear; a floor; means joining the lower edge of the wall to the side and rear edges of said floor; an articulated means for reinforcing said enclosure passing along and secured to the upper and front edges of said wall, said reinforcing means constituting at least two wire rod frames attached to the front and upper edges of the wall; means connecting said reinforcing means to said floor adjacent the lower front corners of each of the sides of said wall enabling fore and aft pivoting of the reinforcing means relative to said floor; a frame and support means secured below and to said floor providing ground engaging means adjacent the rear of said floor and coupling means adjacent the front of said floor for attachment to a mower; an enclosure brace and latching means constituting a wire rod rear frame with attachment means pivotally secured adjacent the rear edge of said floor outside of said enclosure for pivoting the rear frame up against the rear part of the wall and having relatively deflectable portions spaced from said pivotally secured attachment means a distance different from the rear wall height; said relatively deflectable portions including at least one upper bent wire rod cradle portion adapted to be disposed under the reinforced upper wall edge and a further bent wire rod clamping portion laterally spaced from said bent wire cradle portion and adapted to be manually deflected and slipped over said reinforced rear wall edge and thereby adapted at laterally spaced locations to releasably cradle and clamp the upper reinforced edge of the rear wall and to securely maintain the enclosure in an operative condition.

2. A grass catcher as defined in claim 1, having at least two of said upper bent wire rod cradle portions at locations which engage the rear wall adjacent the two ends of the rear wall upper edge for cradling the reinforced rear edge at two spaced apart locations and said bent wire rod clamping portion is disposed between and offset from said cradle portions enabling deflection and positioning over said reinforced rear edge to clamp it down into the bent wire rod cradle portions.

3. A grass catcher as defined in claim 1, wherein said rear frame is a single wire rod shaped in the manner of a bail, the two legs of which have end pivot means coupled to said floor and the lateral wire rod portion of said bail extends between the legs and includes said cradle and clamping portions.

4. A grass catcher as defined in claim 3, wherein the effective straight line length of said legs is greater than the height dimension of the rear portion of said wall.

5. A grass catcher comprising: an enclosure having a continuous wall along two sides and the rear; a floor; means joining the lower edge of the wall to the side and rear edges of said floor; an articulated means for reinforcing said enclosure passing along and secured to the upper and front edges of said wall; means connecting said reinforcing means to said floor adjacent the lower front corners of each of the sides of said wall enabling fore and aft pivoting of the reinforcing means relative to said floor; a frame and support means secured below and to said floor providing ground engaging means adjacent the rear of said floor and a coupling means adjacent the front of said floor for attachment to a mower, said frame and support means comprising bent wire rod means secured to the underside of said floor and having two elongate wire rod means coupling legs extending forward to a location adjacent the front corners of said floor and laterally aligned wire rod portions disposed rearwardly of the rear edge of said floor; an enclosure brace and latching means with attachment means pivotally connected to said laterally aligned wire rod portions adjacent the rear of said floor outside of said enclosure and having relatively deflectable portions, spaced from said pivotally secured attachment means a distance different from the rear wall height, adapted at laterally spaced locations to releasably cradle and clamp the upper reinforced edge of the rear wall and to securely maintain the enclosure in an operative condition.

6. A grass catcher as defined in claim 5 wherein, ground engaging rolling means are journalled for rotation on said laterally aligned wire rod portions.

7. A grass catcher as defined in claim 6, wherein the axis of rotation of said rolling means is above the level of said floor.

8. A grass catcher as defined in claim 5, wherein said bent wire rod means of said frame and support means is a single heavy wire rod bent to form a substantially horizontal W-shape wherein said two legs are the outer legs and said laterally aligned portions are the lower parts of the bottoms of the W-shaped wire rod.

9. A grass catcher as defined in claim 6, wherein said axle portions of the bent rod are inclined upwardly behind the rear edge of said floor to dispose the axis of rotation of said rolling means above the level of said floor.

10. A grass catcher comprising: an enclosure having a continuous wall along two sides and the rear; a floor; means joining the lower edge of the wall to the side and rear edges of said floor; an articulated means for reinforcing said enclosure passing along and secured to the upper and front edges of said wall; means connecting said reinforcing means to said floor adjacent the lower front corners of each of the sides of said wall enabling fore and aft pivoting of the reinforcing means relative to said floor; a frame and support means secured below and to said floor providing ground engaging means adjacent the rear of said floor and coupling means adjacent the front of said floor for attachment to a mower; an enclosure brace and latching means with attachment means pivotally secured adjacent the rear of said floor outside of said enclosure and having relatively deflectable portions, spaced from said pivotally secured attachment means a distance different from the rear wall height, adapted at laterally spaced locations to releasably cradle and clamp the upper reinforced edge of the rear wall and to securely maintain the enclosure in an operative condition; said rear brace and latching means constituting a single wire rod shaped in the manner of a bail, the two legs of which have end pivot means and constitute said attachment means pivotally secured to said floor and the lateral wire rod portion of said bail extends between the rear brace legs and includes said deflectable cradle and clamp portions.

11. A grass catcher as defined in claim 10, wherein said frame and support means comprises bent wire rod means secured to the underside of said floor and having elongate wire rod means coupling legs extending forward to a location adjacent the front corners of said floor, and laterally aligned wire rod portions disposed rearwardly of the rear edge of said floor; and said leg pivot means are pivotally connected to said floor via said laterally aligned wire rod portions of said frame and support means.

12. A grass catcher as defined in claim 10, wherein said means on said lateral wire rod portion comprises at least one roller journalled for rotation on a part of said clamping portion.

13. A grass catcher as defined in claim 10, wherein means are fastened on said lateral wire rod portion enabling easy manipulation of said clamping portion over the top of the reinforced rear edge of the wall.

14. A grass catcher as defined in claim 10, wherein said means on said lateral wire rod portion comprises a lever tab rotatably mounted between said cradle portions.

15. A grass catcher as defined in claim 13, wherein said means fastened on said lateral wire rod portion comprises means providing low friction engagement with said reinforced rear edge of the wall during manipulation between latched and unlatched condition.

16. A grass catcher as defined in claim 15, wherein said means fastened on said lateral wire rod portion are rolling means.

17. A grass catcher as defined in claim 15, wherein said means on said lateral wire rod portion comprises a low friction plastic covering on at least a part of said clamping portion.

* * * * *